United States Patent
Menger

(10) Patent No.: US 7,174,052 B2
(45) Date of Patent: Feb. 6, 2007

(54) METHOD AND APPARATUS FOR FAULT-TOLERANT PARALLEL COMPUTATION

(75) Inventor: William Meredith Menger, Houston, TX (US)

(73) Assignee: ConocoPhillips Company, Houston, TX (US)

(*) Notice: Subject to any disclaimer, the term of this patent is extended or adjusted under 35 U.S.C. 154(b) by 829 days.

(21) Appl. No.: 10/342,829

(22) Filed: Jan. 15, 2003

(65) Prior Publication Data

US 2004/0136613 A1    Jul. 15, 2004

(51) Int. Cl.
*G06K 9/54* (2006.01)
*G06K 9/60* (2006.01)
*G06K 9/32* (2006.01)
*G09G 5/00* (2006.01)
*G06F 15/80* (2006.01)

(52) U.S. Cl. .................. 382/304; 382/299; 345/660
(58) Field of Classification Search .............. 382/304, 382/298, 299, 260, 312; 345/502, 505, 564, 345/660, 667, 670, 671, 698; 348/246, 247; 358/1.2

See application file for complete search history.

(56) References Cited

U.S. PATENT DOCUMENTS

| | | | |
|---|---|---|---|
| 5,032,989 A | 7/1991 | Tornetta | 364/401 |
| 5,208,872 A * | 5/1993 | Fisher | 382/300 |
| 5,574,917 A | 11/1996 | Good et al. | 395/561 |
| 5,802,547 A | 9/1998 | Legvold | 711/100 |
| 5,839,100 A | 11/1998 | Wegener | 704/220 |
| 5,909,580 A | 6/1999 | Crelier et al. | 395/705 |
| 6,023,655 A | 2/2000 | Nomura | 701/208 |
| 6,075,470 A | 6/2000 | Little et al. | 341/107 |
| 6,137,914 A | 10/2000 | Ligtenberg et al. | 382/240 |
| 6,144,889 A | 11/2000 | Kammler et al. | 700/86 |
| 6,253,374 B1 | 6/2001 | Dresevic et al. | 717/11 |
| 6,289,382 B1 | 9/2001 | Bowman-Amuah | 709/226 |
| 6,308,146 B1 | 10/2001 | La Cascia, Jr. et al. | 703/22 |
| 6,330,363 B1 | 12/2001 | Accad | 382/232 |
| 6,374,336 B1 | 4/2002 | Peters et al. | 711/167 |
| 6,411,227 B1 | 6/2002 | Fish | 341/65 |

(Continued)

FOREIGN PATENT DOCUMENTS

EP    1 211 597 A2    6/2002

(Continued)

OTHER PUBLICATIONS

Berny Goodheart and James Cox, "*The Magic Garden Explained*", *The Internals of UNIX® System V Release 4: An Open Systems Design*, Copyright 1994 by Prentice Hall of Australia Pty Ltd., 2 cover pages and pp. 27, 28, 38, 60 and 61.

(Continued)

*Primary Examiner*—Yon J. Couso
(74) *Attorney, Agent, or Firm*—Hitchcock Evert LLP

(57) ABSTRACT

A method and an apparatus for fault-tolerant computing in a parallel processing environment. Intermediate data points are determined from a set of input data by a plurality of processing elements operating in parallel. Preferably, the resolution of the intermediate data points is greater than the resolution required in an output imaging data set. The intermediate data points are spatially re-gridded to the resolution required in the output imaging data set, ignoring any missing data as a result of a processing element failing.

39 Claims, 1 Drawing Sheet

U.S. PATENT DOCUMENTS

| | | | |
|---|---|---|---|
| 6,442,748 B1 | 8/2002 | Bowman-Amuah | 717/3 |
| 6,460,127 B1* | 10/2002 | Akerib | 712/10 |
| 6,825,857 B2* | 11/2004 | Harasimiuk | 345/660 |
| 6,870,964 B1* | 3/2005 | Cooper | 382/254 |
| 6,906,748 B1* | 6/2005 | Kawase et al. | 348/246 |
| 2001/0056433 A1 | 12/2001 | Adelson et al. | 707/104.1 |

FOREIGN PATENT DOCUMENTS

| | | |
|---|---|---|
| WO | WO 00/38033 A2 | 6/2000 |

OTHER PUBLICATIONS

Russ Rew, Glenn Davis, Steve Emmerson and Harvey Davies, "NetCDR User's Guide", An interface for Data Access, Version. 2.4, Unidata Program Center, Feb. 1996 (166 pages) Feb. 1996.

"IBM AIX Parallel I/O File System for IBM RS/6000 SP V1.2", website: http://www-jics.cs.utk.edu/SP2/piofsv12.html, May 28, 1997 (8 pages).

"CEWES MSRC Scalable Parallel Programming Tools Software Catalog", website: http://www.rs6000.ibm.com/software/sp_products/piofs.html, Jan. 29, 1999 (1 page).

Ruth A. Aydt, "Pablo Self-Defining Data Format", Pablo Research Group, Department of Computer Science, University of Illinois, Urbana, Illinois, Mar. 17, 1992 (Last Revised: Feb. 14, 2000), 47 pages.

"DG/UX (V.4.2)", website: http://techupdate.cnet.com/enterprise/o-6133429-723-3730757.html, Apr. 12, 2000 (5 pages).

"Extensible Markup Language (XML) 1.0 (Second Edition) W3C Recommendation Oct. 6, 2000", website: http://222.w3.org/TR/2000/REC-xml-20001006(XHTML, XML, PDF, XHTML, review version with color-coded revision indicators), file: //C:\XML.html, Mar. 22, 2001 (52 pages).

* cited by examiner

US 7,174,052 B2

METHOD AND APPARATUS FOR FAULT-TOLERANT PARALLEL COMPUTATION

FIELD OF THE INVENTION

The invention relates generally to parallel computing and, more particularly, to a method and an apparatus for providing fault-tolerant parallel computing.

BACKGROUND OF THE INVENTION

Imaging systems, such as seismic imaging, magnetic resonance imaging (MRI), computed tomography (CAT) imaging, and X-ray tomography imaging systems and the like, typically involve the data acquisition, analysis, and interpretation of massive amounts of data. Generally, one or more sensors (sometimes thousands) collect raw imaging data that represent certain characteristics of an object. The collected imaging data are provided as input to imaging algorithms that reduce the massive amounts of imaging data into a much smaller representation, referred to as an output data set, of a physical object. The output data set is typically a 2- or 3-dimensional gridded data set wherein each grid point of the output data set represents characteristics about the object at a specific location in 2- or 3-dimensional space, respectively. The grid points are generally positioned at predetermined intervals, such as grid points at one meter intervals, one centimeter intervals, or the like.

For example, seismic imaging systems, such as a Prestack Depth Migration system, generally collect data regarding energy waves generated from an energy source that are reflected by various geological structures. The data collected by the sensors vary as a function of time and the positions of the energy source and the sensor collecting the data. Imaging algorithms operate on the collected data and generate a 2- or 3-dimensional representation of the geological structure.

Due to the large amounts of data, many imaging systems utilize parallel processing techniques in an attempt to reduce the time required to process the collected imaging data and to create the output data set. Generally, parallel processing techniques utilize a plurality of processing elements (PEs) operating on the collected imaging data. Each PE calculates a portion of the output data set, i.e., each PE calculating specific grid points of the output data set. After the PEs have calculated their portion of the output data set, the output of all of the PEs is combined to create the output data set.

The output data set produced by utilizing parallel processing techniques with a plurality of PEs, however, may not be reliable if one or more of the PEs fail while the output data are being calculated. Specifically, if a PE fails during the calculation of the output data, then "holes" or missing data will result when reassembly occurs. Recovery from the problem of missing data is generally accomplished by: (1) re-performing the entire analysis of the imaging data; (2) performing a subsequent task to recompute the missing portions of the output; or (3) re-configuring the job on the fly, always looking for PEs that become available after others have failed. Method (1) is the worst-case scenario, but if elapsed processing time is not critical, this is the least-effort method and is typically preferred. Method (2) requires configuring a subsequent computer job, which takes some human intervention, but will cause the elapsed time to be reduced because the small uncomputed portion of the job can be spread over many PEs to minimize the subsequent run times. Method (3) is the most difficult to code and maintain because it requires a monitoring node to constantly evaluate the state of all of the worker nodes and requires the monitoring node to re-assign tasks and re-apportion job segments. Method (3), however, is the most robust method.

Therefore, there is a need to provide a method and an apparatus to efficiently perform fault-tolerant parallel processing.

SUMMARY OF THE INVENTION

One aspect of the present invention is directed to an apparatus having a plurality of processing elements (PEs) and a host computer. The PEs accept as input an input data set that represents information regarding a scanned object received by sensors of an imaging system. The PEs generate from the input data set an intermediate data set, which is a gridded representation of the scanned object. The host computer performs spatial regridding on the intermediate data set to create an output data set having the desired grid density. In the preferred embodiment, the grid density of the intermediate data set is preferably greater than the grid density of the output data set.

Another aspect of the present invention relates to a method for generating a gridded output data set from an input data set. The input data set represents the information of a scanned object received by sensors in an imaging system. Processing elements accept as input the input data set and generate an intermediate data set, which is a gridded representation of the scanned object in 2- or 3-dimensions. The intermediate data set is spatially regridded to create an output data set, which is a gridded representation of the scanned object. In the preferred embodiment, the grid density of the intermediate data set is preferably greater than the grid density of the output data set.

BRIEF DESCRIPTION OF THE DRAWINGS

A more complete understanding of the present invention and its advantages will be readily apparent from the following Detailed Description of the preferred embodiments taken in conjunction with the accompanying drawings. Throughout the accompanying drawings, like parts are designated by like reference numerals and in which.

DETAILED DESCRIPTION OF THE PREFERRED EMBODIMENTS

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning programming, communications, database structures, and the like have been omitted inasmuch as such details are not considered necessary to obtain a complete understanding of the present invention, and are considered to be within the skills of persons of ordinary skill in the relevant art.

It is further noted that, unless otherwise indicated, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless otherwise indicated.

Figure 1:
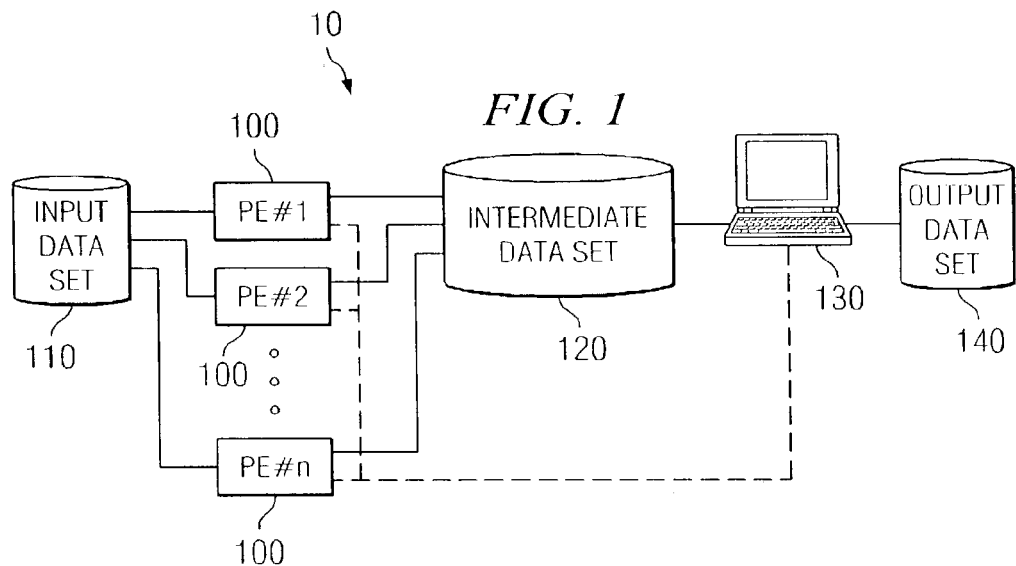
FIG. 1 is a schematic illustration of a computer network in accordance with one embodiment of the present invention.

Referring to FIG. 1 of the drawings, an imaging system 10 is illustrated in accordance with one embodiment of the present invention as comprising a plurality of processing elements (PEs) 100 configured for accepting as input an input imaging set 110 and generating as output an intermediate data set 120. The processes performed by the PEs 100 are preferably controlled by one or more host computers 130, as indicated by the dashed line between the host computer 130 and the PEs 100. Furthermore, the host computer 130 is configured for accepting as input the intermediate data set 120 and generating an output data set 140.

The input imaging set 110 contains the imaging data collected from one or more sensors (not shown) of an imaging system, such as an MRI, a CRT, an X-ray tomography, seismic imaging systems, or the like. Furthermore, the present invention is independent of format of the input imaging set and the algorithm performed by the PEs to derive the intermediate data set 130. Thus, as one skilled in the art will appreciate, the present invention may be used in any imaging system in which a plurality of processors are utilized to process imaging data. The format, content and use of the input imaging set 110 is considered to be within the skills of persons of ordinary skill in the art and, therefore, will not be described in greater detail herein.

The intermediate data set 120 and the output data set 140 are gridded data sets that represent the physical object. The intermediate and output data sets 120, 140 contain information regarding the imaged object at specific locations, referred to as grid points. The grid points are typically located at predetermined intervals in 2- or 3-dimensional space, such as one meter intervals, one centimeter intervals, or the like. The grid density (the number of grid points within a specified area) is preferably greater in the intermediate data set 120 than the output data set 140. Furthermore, in accordance with one embodiment of the present invention, each of the specific grid points are calculated by one or more PEs.

The input imaging set 110, intermediate data set 120 and the output data set 140 may be physically contained in any storage medium or simply passed as an argument to a computer or a process performed on a computer. Specifically, the input, intermediate and output data sets 110, 120 and 140, respectively, may be stored on a magnetic medium, optical medium, or any other type of storage medium that is accessible to the PEs 100 and/or the host computer 130. Additionally, the data sets may be represented as textual data, binary data, or any other format, and may be represented as a file on a storage medium, a graphical representation, or any other representation.

The PEs 100 comprise a multiple processor system utilizing substantially parallel processing techniques. A multiple processor system may comprise a single computer utilizing a plurality of processors, multiple discrete computers each with one or more processors, or some combination thereof. Accordingly, while the PEs in FIG. 1 are depicted as discrete computers, the present invention is not limited thereto.

The host computer 130 may be any computer such as a personal computer, workstation, minicomputer, mainframe, or some combination thereof. Furthermore, the host computer 130 is illustrated in FIG. 1 as a discrete element, separate from the PEs 100, for illustrative purposes only. As such, the host computer 130 may also comprise a process operating on a computer, including a process operating on one or more of the PEs 100 or on a computer system discrete from the PEs 10. Additionally, the host computer 130 may be a separate, stand-alone computer or may be housed with one or more of the PEs 100.

Figure 2:
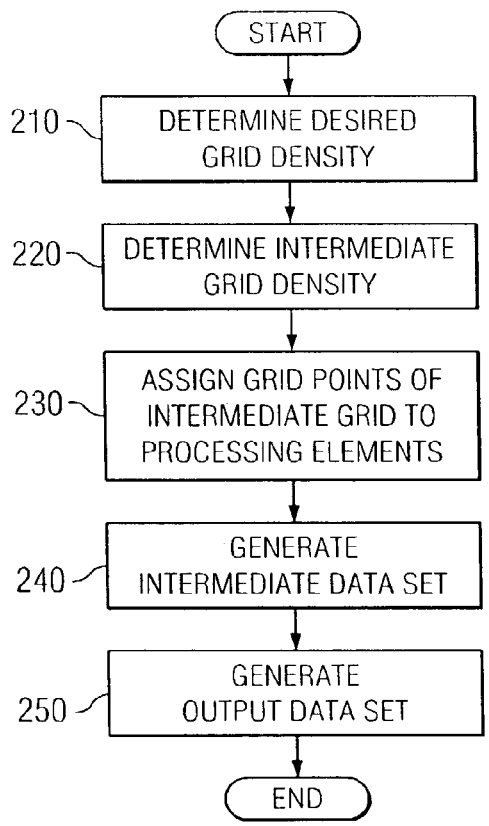
FIG. 2 is a data flow diagram illustrating one embodiment of the present invention in which imaging data is converted to a gridded representation of an imaged object.

FIG. 2 is a flow chart depicting steps that may be performed by the imaging system 10 (FIG. 1) in accordance with one embodiment of the present invention that interprets the input imaging data 110 and generates an output data set 140. Processing begins in step 210, wherein the desired grid density, i.e., the number of grid points within a predetermined area, of the output data set 140 is determined. Generally, the grid density of the output data set is dependent upon the type and purpose of the imaging system. For example, a seismic imaging system may require a desired grid density of one grid point per meter. Imaging systems such as an MRI and a CRT imaging systems, however, generally require a much greater grid density.

After determining the desired grid density of the output data set 140 in step 210, processing proceeds to step 220, wherein an intermediate grid density is determined. The intermediate grid density is the grid density of the intermediate data set 120. Preferably, the intermediate grid density is greater than the desired output grid density.

As will be explained in greater detail below, the grid density of the intermediate grid density allows the output data set 140 to be calculated accurately in the event one or more of the PEs 100 fail, which results in missing data, or "holes." Alternatively, however, the intermediate grid density may be equivalent to or greater than the output grid density, although the accuracy of the output data set may be degraded. For example, in a seismic imaging system that requires a grid density of 1 meter and an expected failure rate of 20% of the PEs, it is preferred that the grid density of the intermediate data set be approximately 0.91 meters.

Preferably, the intermediate grid density is calculated based at least in part upon the expected failure rate of the PEs 100. One particular embodiment of the present invention provides for an intermediate grid density selected such that the number of grid points is equal to the number of grid points contained in the output data set 140 increased by the expected failure rate of the PEs 100. For example, in a 2-dimensional imaging system that yields an output image of 10×10 grid points (100 total grid points) and a PE failure rate of 20%, at least a total of 120 grid points would be calculated in the intermediate data set 130. To achieve this, the number of grid points in each dimension is increased in proportion to the dimensions of the desired grid density. In this case, the intermediate data set 130 would contain 11×11 grid points (a total of 121 grid points). Other methods may be used incorporating, for example, backup PEs, the size of the image, required accuracy, and the like.

After calculating the grid density of the intermediate data set 120 in step 220, processing proceeds to step 230, wherein each grid point of the intermediate data set 120 that is to be calculated is assigned to a specific PE of the PEs 100. Generally, it is preferred that no two adjacent grid points are calculated by any one PE of the PEs 100. Accordingly, each PE preferably calculates grid points in specific intervals, referred to as the stride, along each dimension. In this manner, if one PE fails, then the adjacent grid points calculated by other PEs may be utilized to determine the grid points of the output data set 140. One method of assigning each grid point of the intermediate data set 120 to a specific PE of the PEs 100 is discussed below with reference to FIG. 3.

Referring back to FIG. 2, processing proceeds to step 240, wherein the intermediate data set 120 is generated by the PEs 100. Each PE accepts as input the input data set 110 and performs an algorithm in accordance with the type of imaging system and the content of the input data set 110, generating the grid points of the intermediate data set assigned to it. As a result of this step, the intermediate data set 120 is generated having a grid density in accordance with the intermediate grid density. If one or more of the PEs 100 fail during this step, then data will be missing or NULL, leaving "holes" in the intermediate data set 120.

Next, in step 250, the output data set 140 is generated. Preferably, a spatial regridding technique is utilized to resample the intermediate data set 120, which contains grid points in the intermediate grid density, to the desired grid density of the output data set 140. Preferably, the values of the grid points of the output data set 140 are calculated in accordance with the following equation (1) for a 3-dimensional image:

$$O_{(i,j,k)} = \frac{\sum I_{(l,m,n)} e^{-r}}{\sum e^{-r}}, \quad (1)$$

for all $r \le \sqrt{S_i^2 + S_j^2 + S_k^2}$ and non-NULL $I_{(l,m,n)}$ wherein:
$O_{(i,j,k)}$ is the calculated value of the output data set 140 at location (i,j,k);
$I_{(l,m,n)}$ is the value of the intermediate data set 120 at location (l,m,n);
$S_i$, $S_j$, and $S_k$ are the strides in the dimensions corresponding to I, J, and K, respectively; and
r is the vector distance between $O_{(i,j,k)}$ and $I_{(l,m,n)}$.

Furthermore, the grid points of the output data set 140 are calculated in accordance with the following equation (2) for a 2-dimensional image:

$$O_{(i,j)} = \frac{\sum I_{(l,m)} e^{-r}}{\sum e^{-r}}, \text{ for all } r \le \sqrt{S_i^2 + S_j^2} \text{ and non-NULL } I_{(l,m)} \quad (2)$$

wherein:
$O_{(i,j)}$ is the value of the output data set at location (i,j);
$I_{(l,m)}$ is the value of the intermediate data set at location (l,m);
$S_i$ and $S_j$ are the strides in the dimensions corresponding to I and J, respectively; and
r is the vector distance between $O_{(i,j)}$ and $I_{(l,m)}$.

Alternatively, the output data set 140 may be generated using a spectral decomposition and a subsequent recomposition using a 2- or 3-dimensional Fast Fourier Transform, or any other frequency transform such as discrete cosine transform or the like. The spectral decomposition and subsequent recomposition using a 2- or 3-dimensional Fast Fourier Transform or other frequency transform is considered to be within the skills of one of ordinary skill in the art, and therefore, will not be discussed in greater detail herein.

In yet another alternative embodiment, two or more PEs are utilized to generate the output data set. In this embodiment, each PE is preferably assigned a data point in the output data set in accordance with the stride calculations discussed above with reference to the intermediate data set. Then, each PE calculates the values of the data points assigned to it as well as the value of one or more and preferably all adjacent data points, resulting in one or more values being calculated for each data point. Then the multiple values calculated for each data point are used to select or compute the ultimately outputted value of the output data for that data point. One method for this in accordance with an embodiment of the present invention, although there are many others, assigns a weight to each value that is inversely proportional to the distance from the data point assigned to the PE and the adjacent data point to which the weight is being assigned. The values calculated for each data point are combined in accordance with the weight to determine the final value assigned to the output data set.

In the event that one or more PEs fail, the value of the grid locations calculated by that PE will be missing, or NULL. Thus, in accordance with the above algorithm, the grid locations containing a NULL value will not be used to calculate the output data set 140.

Figure 3:
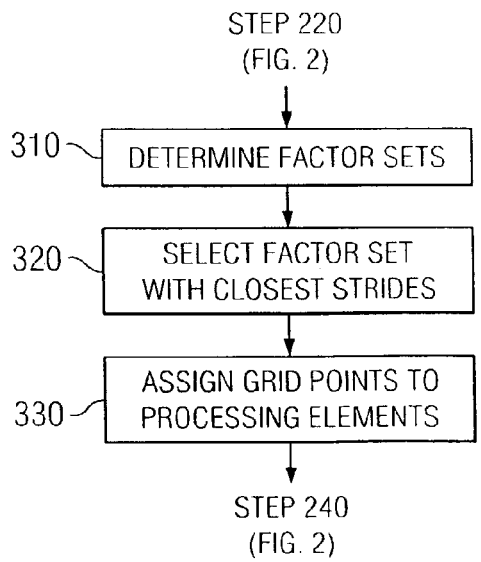
FIG. 3 is a data flow diagram illustrating one embodiment of the present invention in which grid point calculations are assigned to processing elements.

FIG. 3 is a flow chart depicting steps that may be performed to assign the calculation of grid points in the intermediate data set 120 to a specific PE, discussed above with respect to step 230 (FIG. 2), in accordance with a preferred embodiment of the present invention. Accordingly, after determining the grid density of the intermediate data set in step 220 (FIG. 2), processing proceeds to step 230 (FIG. 2), the details of which are depicted by FIG. 3.

Processing begins in step 310, wherein factor sets of the number of PEs are determined. A factor set is a set of numbers that when multiplied together equals the number of PEs, each factor set containing a number of factors equal to the number of dimensions. Thus, a factor set for a 2-dimensional image contains two numbers, and a factor set for a 3-dimensional image contains three numbers. The factors of the factor set represent the interval, or stride, between grid points that each PE will generate in each dimension. For example, in a 2-dimensional imaging system, a factor set of (x,y) represents that each PE will generate every $x^{th}$ grid point in one dimension and every $y^{th}$ grid point in the other dimension.

Next, in step 320, the factor set representing the minimum distance between the strides in each dimension is selected. For example, if a 2-dimensional imaging system comprises 30 PEs, then the factor set (6,5) would be selected over the factor set (10,3), because the difference between the strides of 6 and 5 is less than the strides of 10 and 3.

As one skilled in the art will appreciate, some numbers of PEs will not factor as optimally as others. For example, prime numbers and certain numbers (such as ten) having few unbalanced factors will not result in an optimum stride. In these cases, one alternative embodiment of the present invention will not utilize one or more of the PEs 100, allowing for a more balanced stride. In the examples listed above, subtracting one from a prime number of PEs guarantees at least one additional factor set, and subtracting one from ten results in nine, which has a perfectly balanced factor set of (3,3).

After selecting the factor set with the smallest difference in the strides in step 320, recessing proceeds to step 330, wherein each grid point is assigned to a specific PE. Preferably, each PE is assigned the grid points in accordance with the stride defined by the factor set determined above in step 320. For example, the following tables illustrate the preferred assignment of PEs in an imaging system comprising 4, 6, and 9 PEs for a 2-dimensional 9×7 grid, wherein each box represents a single grid point and the number within the box represents the PE assigned to calculate that grid point.

| 4 Processing Elements (Stride = (2, 2)) | | | | | | | | |
|---|---|---|---|---|---|---|---|---|
| 1 | 2 | 1 | 2 | 1 | 2 | 1 | 2 | 1 |
| 3 | 4 | 3 | 4 | 3 | 4 | 3 | 4 | 3 |
| 1 | 2 | 1 | 2 | 1 | 2 | 1 | 2 | 1 |
| 3 | 4 | 3 | 4 | 3 | 4 | 3 | 4 | 3 |
| 1 | 2 | 1 | 2 | 1 | 2 | 1 | 2 | 1 |
| 3 | 4 | 3 | 4 | 3 | 4 | 3 | 4 | 3 |
| 1 | 2 | 1 | 2 | 1 | 2 | 1 | 2 | 1 |

| 6 Processing Elements (Stride = (3, 2)) | | | | | | | | |
|---|---|---|---|---|---|---|---|---|
| 1 | 2 | 3 | 1 | 2 | 3 | 1 | 2 | 3 |
| 4 | 5 | 6 | 4 | 5 | 6 | 4 | 5 | 6 |
| 1 | 2 | 3 | 1 | 2 | 3 | 1 | 2 | 3 |
| 4 | 5 | 6 | 4 | 5 | 6 | 4 | 5 | 6 |
| 1 | 2 | 3 | 1 | 2 | 3 | 1 | 2 | 3 |
| 4 | 5 | 6 | 4 | 5 | 6 | 4 | 5 | 6 |
| 1 | 2 | 3 | 1 | 2 | 3 | 1 | 2 | 3 |

| 9 Processing Elements (Stride = (3, 3)) | | | | | | | | |
|---|---|---|---|---|---|---|---|---|
| 1 | 2 | 3 | 1 | 2 | 3 | 1 | 2 | 3 |
| 4 | 5 | 6 | 4 | 5 | 6 | 4 | 5 | 6 |
| 7 | 8 | 9 | 7 | 8 | 9 | 7 | 8 | 9 |
| 1 | 2 | 3 | 1 | 2 | 3 | 1 | 2 | 3 |
| 4 | 5 | 6 | 4 | 5 | 6 | 4 | 5 | 6 |
| 7 | 8 | 9 | 7 | 8 | 9 | 7 | 8 | 9 |
| 1 | 2 | 3 | 1 | 2 | 3 | 1 | 2 | 3 |

The following source code is a representative example of a software program that may be utilized to determine the strides in each direction for a 2-dimensional and 3-dimensional imaging system in accordance with one embodiment of the present invention.

```
/*
    This program shows a method for establishing optimal computing
    architecture for a cluster of compute nodes (processing elements
    or PEs)when solving a gridded output volume. The purpose of this
    exercise is to try to most evenly distribute the set of grid
    points that any one PE calculates throughout the volume, so as to
    most evenly distribute any "holes" in the output should a PE fail
    during the calculations.
    The basic method is to factor the number of PEs for a particular
    N-dimensional output volume so that the stride along any one
    dimension is as close to the strides in the other dimensions as
    possible.
    Once this is accomplished, the number of grid points that will be
    calculated by each PE is determined and the output volume is
    adjusted to   accomodate any loose-ends so that each PE does the
    same amount of work.
*/
#include <stdio.h>
#include <math.h>
void   bsort (int n, int * facts);
int    factor (int n, int * facts, int ndim);
void   balance (int n, int * facts);
typedef struct node {
        int *start;
} NODE;
    int main (int argc, char ** argv) {
    int nproc_elems;
    int ngrid_pts;
    int ndimens;
    int *sizeofdim,*ngroup,*istart,*stride,*facts;
    int i,j,idim,k,jdim,nf,ll;
    double x,y,z,q,r;
    NODE *nodes;
    if( argc <= 1 ) {
        printf("%s: USAGE:\n\t\t$ %s #PE #DIM sizeof1,
            sizeof2...\n",argv[0],argv[0]);
        return 1;
    }
    nproc_elems=atoi(argv[1]);
    ndimens=atoi(argv[2]);
    if( argc <= ndimens+2 ) {
        printf("%s: USAGE:\n\t\t$ %s #PE #DIM sizeof1,
            sizeof2...\n",argv[0],argv[0]);
        return 1;
    }
    sizeofdim   = (int *) malloc(ndimens);
    istart      = (int *) malloc(ndimens);
    stride      = (int *) calloc(ndimens,sizeof(istart));
    ngroup      = (int *) malloc(ndimens);
    /* Allocate memory for the nodes */
    nodes       = (NODE *) calloc(nproc_elems, sizeof(NODE) );
    facts       = (int *) malloc(100);
/* INITIALIZE EACH NODE ELEMENT */
for (i=0;i<nproc_elems;i++){
    nodes[i].start = (int *) malloc(ndimens+1);
}
ngrid_pts=1;
for (i=0;i<ndimens;i++){
    sizeofdim[i] = atoi(argv[i+3]);
    printf("size of dim[%d]=%d\n",i+1,sizeofdim[i]);
    ngrid_pts *= sizeofdim[i];
}
printf("nproc_elements=%d ngrid_pts=%d ndimens=%d\n",
    nproc_elems,ngrid_pts,ndimens);
/* Now we have our parameters, we can work the problem. */
x = nproc_elems;
y = ngrid_pts;
z = ndimens;
q = ceil(y/x);
r = ceil(y/z);
/*
    Determine the stride between output grid points that
    will be computed with the same PE.
*/
if( factor(nproc_elems,stride,ndimens) != ndimens ) {
    printf("Error factoring number of processors into sub-cube\n");
    return 1;
}
/*
    Balance the factors as best we can
*/
balance(ndimens,stride);
/*
    Sort the stride vector and the output volume sizes
*/
bsort(ndimens,stride);
bsort(ndimens,sizeofdim);
printf("\nUsing %d processing elements in %d dimensions.\n",
    nproc_elems,ndimens);
for (i=0;i<ndimens;i++){
    q = sizeofdim[i];
    z = stride[i];
    r = ceil(q/z);
    ngroup[i] = (int ) r;
```

-continued

```
        printf("For dim[%d] (%d grid pts) Use stride of %d",
                i+1,sizeofdim[i],stride[i]);
            printf(" resulting in %d elements per PE.\n", ngroup[i]);
    }
    for (i=0,j=1;i<ndimens;i++){ j *= ngroup[i]; }
    printf("\nEach PE will compute %d grid points on the output
volume.\n",j);
    if (j*nproc_elems > ngrid_pts ) {
        printf("Output volume increased to %d
                points\n",j*nproc_elems);
        for(i=0;i<ndimens;i++){
            printf("Size of dim[%d] is now %d points.\n",
                i+1,stride[i]*ngroup[i]);
        }
    }
    /* LOAD and DISPLAY THE "NODE" array */
    for (idim=0;idim<ndimens;idim++){istart[idim] = 0;}
    for (i=0;i<nproc_elems;i++){
        printf("Node[%d]: ( ",i);
        for (idim=0;idim<ndimens;idim++){
            k=0;
            for(jdim=idim-1;jdim>=0;jdim--)
                { if(istart[jdim] != 0 ) k = 1;}
            if(k == 0 && i > 0 ) istart[idim]++;
            istart[idim] = istart[idim]%stride[idim];
            printf("%d ",istart[idim]);
            nodes[i].start[idim]=istart[idim];
        }
        printf(")\n");
    }
    /*
        CLEAN UP
    */
    free(sizeofdim);
    free(ngroup);
    free(istart);
    free(stride);
    for (i=0;i<nproc_elems;i++){ free(nodes[i].start); }
    free(nodes);
    free(facts);
    return 0;
}
int factor(int n, int * facts, int ndim) {
/*  Purpose:To factor "n" into "ndim" factors and place the
    factors into the output vector "factors"
*/
    int i;
    int j=0;
    if (ndim < 1) return -1;
    for(i=0;i<ndim;i++){facts[i]=1;}
    if(ndim == 1) {
        facts[0] = n;
        return 1;
    }
    i = 1 + sqrt(1.*n);
    for(i=1+sqrt(1.*n);i>1;i--){
        if(i*(n/i) == n) {
            facts[j++] = i;
            j += factor(n/i,&facts[j],--ndim);
            return j;
        }
    }
    i = sqrt(1.*n);
    for(i=sqrt(1.*n);i<=n/2;i++){
        if (i*(n/i) == n) {
            facts[j++] = i;
            j += factor(n/i,&facts[j],--ndim);
            return j;
        }
    }
    i = 1;
    facts[j++] = i;
    j += factor(n/i,&facts[j],--ndim);
    return j;
}
void bsort(int n, int * facts) {
/*  Purpose:To sort factors into decreasing order */
    int i,k,g;
    /* Sort into decreasing order first */
    for (i=0;i<n-1;i++) {
        for (k=i+1;k<n;k++){
            if (facts[i] < facts[k] ) {
                g   = facts[i];
                facts[i] = facts[k];
                facts[k] = g;
            }
        }
    }
}
void balance(int n,int * facts) {
/*  Purpose:To balance magnitudes of a set of "n" factors
    "*facts" so that they are more close to each other.
*/
    int i,j,k,f,g,changed=1;
    bsort(n,facts);
    /* evaluate each factor to see if it can be divisible by small
       primes then if so, see if dividing it by the prime and
       multiplying another factor by that prime would help balance
       factors
    */
    while (changed == 1){
        changed = 0;
        for (i=0,j=2;i<n-1;i++){
            for (k=i+1;k<n-1;k++) {
                f = facts[i];
                g = facts[k];
                for (j=2;j<=19;j++){
                    if(j%2 == 0 && j>2) || (j%3 == 0 && j>3) ) {
                    } else {
                        if(j*(f/j) == f && f/j > g ) {
                            facts[i] /= j;
                            facts[k] *= j;
                            f = facts[i];
                            g = facts[k];
                            if(f> g) changed = 1;
                        }
                    }
                }
            }
        }
    }
}
```

Thereafter, processing returns to step 240 (FIG. 2), wherein the output data set is created.

It is understood that the present invention can take many forms and embodiments. Accordingly, several variations may be made in the foregoing without departing from the spirit or the scope of the invention. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method of generating from collected imaging data an output data set representing an object, the method comprising the steps of:

assigning grid points to be calculated of an intermediate data set to at least one of a plurality of processing elements, a resolution of the intermediate data set being greater than a desired resolution of the output data set;

generating from the collected imaging data by the plurality of processing elements the intermediate data set; and generating from the intermediate data set the output data set having grid points of the desired resolution.

2. The method of claim 1, wherein the step of assigning is performed so as to reduce the instances that one of the processing elements is assigned to generate adjacent grid points.

3. The method of claim 1, wherein the step of assigning includes the steps of:

determining one or more factor sets from the number of available processing elements, each factor set containing a number of factors equivalent to the dimensions of the intermediate data set;

selecting from the factor sets a selected factor set in which the distance between the factors of the selected factor set is the least among the factor sets; and assigning each grid point of the intermediate data set to the processing elements such that for each dimension of the intermediate data set each processing element calculates grid points at intervals substantially equivalent to the factors of the selected factor set in each respective dimension.

4. The method of claim 1, wherein the step of generating the output data set is performed by spatially regridding the intermediate data set.

5. The method of claim 1, wherein the step of generating the output data set is performed by a spectral decomposition and subsequent recomposition using a frequency transform.

6. The method of claim 1, wherein the step of generating the output data set is performed by a spectral decomposition and subsequent recomposition using a Fast Fourier Transform.

7. The method of claim 1, wherein the step of generating the output data set includes the steps of:

assigning each grid point of the output data set to at least one of the plurality of processing elements;

generating by one or more of the processing elements values for the grid points assigned to the processing elements and adjacent grid points; and generating by one or more of the processing elements the output data set as the weighted sum of the values generated for each grid point of the output data set.

8. The method of claim 1, wherein the output data set represents a 2-dimensional image and the step of generating the output data set includes calculating each grid point of the output data set in accordance with the following equation:

$$O_{(i,j)} = \frac{\sum I_{(l,m)} e^{-r}}{\sum e^{-r}}, \text{ for all } r \le \sqrt{S_i^2 + S_j^2} \text{ and non-NULL } I_{(l,m)},$$

wherein:

$O_{(i,j)}$ is the value of the output data set at location (i,j);

$I_{(l,m)}$ is the value of the intermediate data set at location (l,m);

$S_i$ and $S_j$ are the strides in the dimensions corresponding to I and J, respectively; and r is the vector distance between $O_{(i,j)}$ and $I_{(l,m)}$.

9. The method of claim 1, wherein the output data set represents a 3-dimensional image and the step of generating the output data set includes calculating each grid point of the output data set in accordance with the following equation:

$$O_{(i,j,k)} = \frac{\sum I_{(l,m,n)} e^{-r}}{\sum e^{-r}}, \text{ for all } r \le \sqrt{S_i^2 + S_j^2 + S_k^2} \text{ and non-NULL } I_{(l,m,n)},$$

wherein:

$O_{(i,j,k)}$ is the calculated value of the output data set 140 at location (i,j,k);

$I_{(l,m,n)}$ is the value of the intermediate data set 120 at location (l,m,n);

$S_i$, $S_j$, and $S_k$ are the strides in the dimensions corresponding to I, J, and K, respectively; and r is the vector distance between $O_{(i,j,k)}$ and $I_{(l,m,n)}$.

10. A method of generating from collected imaging data an output data set representing an object, the method comprising the steps of:

determining an intermediate grid density of an intermediate data set, the intermediate grid density having a plurality of grid points and being more dense than a desired grid density of the output data set;

assigning each grid point of the intermediate data set to at least one of a plurality of processing elements, the grid points being positioned in accordance with the intermediate grid density;

generating by the processing elements each grid point of the intermediate data set; and generating from the intermediate data set the output data set having the desired grid density.

11. The method of claim 10, wherein the step of assigning is performed so as to reduce the instances that one of the processing elements is assigned to generate adjacent grid points.

12. The method of claim 10, wherein the step of assigning includes the steps of:

determining one or more factor sets of the number of available processing elements, each factor set containing a number of factors equivalent to the dimensions of the intermediate data set;

selecting from the factor sets a selected factor set in which a distance between the factors of the selected factor set is the least among the factor sets; and assigning each grid point of the intermediate data set to the processing elements such that for each dimension of the intermediate data set each processing element calculates grid points at intervals equal to the factors of the selected factor set in each respective dimension.

13. The method of claim 10, wherein the step of determining the intermediate grid density is based at least in part upon the failure rate of the processing elements.

14. The method of claim 10, wherein the step of generating the output data set is performed by spatially regridding the intermediate data set.

15. The method of claim 10, wherein the step of generating the output data set is performed by a spectral decomposition and subsequent recomposition using a frequency transform.

16. The method of claim 10, wherein the step of generating the output data set is performed by a spectral decomposition and subsequent recomposition using a Fast Fourier Transform.

17. The method of claim 10, wherein the step of generating the output data set includes the steps of:
   assigning each grid point of the output data set to at least one of the plurality of processing elements;
   generating by one or more of the processing elements values for the grid points assigned to the processing elements and adjacent grid points; and
   generating by one or more of the processing elements the output data set as the weighted sum of the values generated for each grid point of the output data set.

18. The method of claim 10, wherein the output data set is a 2-dimensional image and the step of generating the output image includes calculating each grid point of the output data set in accordance with the following equation:

$$O_{(i,j)} = \frac{\sum I_{(l,m)} e^{-r}}{\sum e^{-r}}, \text{ for all } r \leq \sqrt{S_i^2 + S_j^2} \text{ and non-NULL } I_{(l,m)},$$

wherein:
$O_{(i,j)}$ is the value of the output data set at location (i,j);
$I_{(l,m)}$ is the value of the intermediate data set at location (l,m);
$S_i$ and $S_j$ are the strides in the dimensions corresponding to I and J, respectively; and
r is the vector distance between $O_{(i,j)}$ and $I_{(l,m)}$.

19. The method of claim 10, wherein the output data set is a 3-dimensional image and the step of generating the output image includes calculating each grid point of the output data set in accordance with the following equation:

$$O_{(i,j,k)} = \frac{\sum I_{(l,m,n)} e^{-r}}{\sum e^{-r}}, \text{ for all } r \leq \sqrt[3]{S_i^2 + S_j^2 + S_k^2} \text{ and non-NULL } I_{(l,m,n)},$$

wherein:
$O_{(i,j,k)}$ is the calculated value of the output data set 140 at location (i,j,k);
$I_{(l,m,n)}$ is the value of the intermediate data set 120 at location (l,m,n);
$S_i$, $S_j$, and $S_k$ are the strides in the dimensions corresponding to I, J, and K, respectively; and
r is the vector distance between $O_{(i,j,k)}$ and $I_{(l,m,n)}$.

20. An apparatus for generating an output data set of an imaged object, the apparatus comprising:
   an input memory device for storing an input data set containing imaging data of the imaged object;
   an intermediate memory device for storing an intermediate data set containing a gridded representation of the imaged object, the intermediate data set having a first grid density;
   an output memory device for storing an output data set containing a gridded representation of the imaged object in a desired grid density, the desired grid density being greater than the first grid density;
   a plurality of processing elements adapted for generating from the input data set the intermediate data set; and
   a host computer adapted for generating from the intermediate data set the output data set.

21. The apparatus of claim 20, wherein the host computer is adapted for spatially regridding the intermediate data set to create the output data set.

22. The apparatus of claim 20, wherein the host computer is adapted for generating the output data set by spectral decomposition and subsequent recomposition using a frequency transform.

23. The apparatus of claim 20, wherein the host computer is adapted for generating the output data set by spectral decomposition and subsequent recomposition using a Fast Fourier Transform.

24. The apparatus of claim 20, wherein the processing elements are adapted for generating the output data set by performing the steps of:
   assigning each grid point of the output data set to at least one of the plurality of processing elements;
   generating by one or more of the processing elements values for the grid points assigned to the processing elements and adjacent grid points; and
   generating by one or more of the processing elements the output data set as the weighted sum of the values generated for each grid point of the output data set.

25. The apparatus of claim 20, wherein the output data set is a 2-dimensional image and the host computer generates the output data set in accordance with the following equation:

$$O_{(i,j)} = \frac{\sum I_{(l,m)} e^{-r}}{\sum e^{-r}}, \text{ for all } r \leq \sqrt{S_i^2 + S_j^2} \text{ and non-NULL } I_{(l,m)},$$

wherein:
$O_{(i,j)}$ is the value of the output data set at location (i,j);
$I_{(l,m)}$ is the value of the intermediate data set at location (l,m);
$S_i$ and $S_j$ are the strides in the dimensions corresponding to I and J, respectively; and
r is the vector distance between $O_{(i,j)}$ and $I_{(l,m)}$.

26. The apparatus of claim 20, wherein the output data set is a 3-dimensional image and the host computer generates the output data set in accordance with the following equation:

$$O_{(i,j,k)} = \frac{\sum I_{(l,m,n)} e^{-r}}{\sum e^{-r}}, \text{ for all } r \leq \sqrt{S_i^2 + S_j^2 + S_k^2} \text{ and non-NULL } I_{(l,m,n)},$$

wherein:
$O_{(i,j,k)}$ is the calculated value of the output data set 140 at location (i,j,k);
$I_{(l,m,n)}$ is the value of the intermediate data set 120 at location (l,m,n);
$S_i$, $S_j$, and $S_k$ are the strides in the dimensions corresponding to I, J, and K, respectively; and
r is the vector distance between $O_{(i,j,k)}$ and $I_{(l,m,n)}$.

27. The apparatus of claim 20, wherein the processing elements are further adapted for determining one or more factor sets of the number of available processing elements, each factor set containing a number of factors equivalent to the dimensions of the intermediate data set; selecting from the factor sets a selected factor set in which a distance between the factors of the selected factor set is the least among the factor sets; and assigning the processing elements such that for each dimension of the intermediate data set each processing element calculates grid points at intervals equal to the factors of the selected factor set in each respective dimension.

28. The apparatus of claim 20, wherein the host computer is one or more of the processing elements.

29. The apparatus for generating an output data set of an imaged object, the apparatus comprising:
- an input memory device for storing an input data set containing imaging data of the imaged object;
- an intermediate memory device for storing an intermediate data set containing a gridded representation of the imaged object, the intermediate data set having a first grid density;
- an output memory device for storing an output data set containing a gridded representation of the imaged object, the output data set having a second grid density, the second grid density being less than or equal to the first grid density;
- a plurality of processing elements adapted for generating from the input data set the intermediate data set; and
- a host computer adapted for spatially regridding the intermediate data set to create the output data set.

30. The apparatus of claim 29, wherein output data set is a 2-dimensional image and the host computer generates the output data set in accordance with the following equation:

$$O_{(i,j)} = \frac{\sum I_{(l,m)} e^{-r}}{\sum e^{-r}}, \text{ for all } r \leq \sqrt{S_i^2 + S_j^2} \text{ and non-NULL } I_{(l,m)},$$

wherein:
- $O_{(i,j)}$ is the value of the output data set at location (i,j);
- $I_{(l,m)}$ is the value of the intermediate data set at location (l,m,);
- $S_i$ and $S_j$ are the strides in the dimensions corresponding to I and J, respectively; and
- r is the vector distance between $O_{(i,j)}$ and $I_{(l,m)}$.

31. The apparatus of claim 29, wherein output data set is a 3-dimensional image and the host computer generates the output data set in accordance with the following equation:

$$O_{(i,j,k)} = \frac{\sum I_{(l,m,n)} e^{-r}}{\sum e^{-r}}, \text{ for all } r \leq \sqrt{S_i^2 + S_j^2 + S_k^2} \text{ and non-NULL } I_{(l,m,n)},$$

wherein:
- $O_{(i,j,k)}$ is the calculated value of the output data set 140 at location (i,j,k);
- $I_{(l,m,n)}$ is the value of the intermediate data set 120 at location (l,m,n);
- $S_i$, $S_j$, and $S_k$ are the strides in the dimensions corresponding to I, J, and K, respectively; and
- r is the vector distance between $O_{(i,j,k)}$ and $I_{(l,m,n)}$.

32. An apparatus of claim 29, wherein the processing elements are further adapted for determining one or more factor sets of the number of available processing elements, each factor set containing a number of factors equivalent to the dimensions of the intermediate data set; selecting from the factor sets a selected factor set in which a distance between the factors of the selected factor set is the least among the factor sets; and assigning the processing elements such that each processing element calculates grid points at intervals equal to the factors of the selected factor set in each respective dimension.

33. The apparatus of claim 29, wherein the host computer is one or more of the processing elements.

34. An apparatus for generating from collected imaging data an output data set representing an object, the apparatus comprising:
- means for assigning a plurality of grid points of an intermediate data set to at least one of a plurality of processing elements, a resolution of the intermediate data set being greater than a desired resolution of the output data set;
- means for receiving imaging data and generating a gridded representation of that data to be saved as the intermediate data set; and
- means for receiving the intermediate data set and generating a gridded representation of that data to be saved as the output data set having the desired resolution.

35. The apparatus of claim 34, wherein the means for assigning includes means for reducing the instances that one of the processing elements is assigned to generate adjacent grid points.

36. The apparatus of claim 34, wherein the means for assigning includes:
- means for determining one or more factor sets of the number of available processing elements, each factor set containing a number of factors equivalent to the dimensions of the intermediate data set;
- means for selecting from the factor sets a selected factor set in which a distance between the factors of the selected factor set is the least among the factor sets; and
- means for assigning the processing elements such that for each dimension of the intermediate data set each processing element calculates grid points at intervals equal to the factors of the selected factor set in each respective dimension.

37. A computer program product for generating from collected imaging data an output data set representing an object, the computer program product residing on a computer readable medium with a computer program embodied thereon, the computer program comprising:
- computer program code for assigning a plurality of grid points of an intermediate data set to at least one of a plurality of processing elements, a resolution of the intermediate data set being greater than a desired resolution of the output data set;
- computer program code for receiving imaging data and generating a gridded representation of that data to be saved as the intermediate data set; and
- computer program code for receiving the intermediate data set and generating a gridded representation of that data to be saved as the output data set having the desired resolution.

38. The computer program product of claim 37, wherein the computer program code for assigning includes computer program code for reducing the instances that one of the processing elements is assigned to generate adjacent grid points.

39. The computer program product of claim 37, wherein the computer program code for assigning includes:
- computer program code for determining one or more factor sets of the number of available processing elements, each factor set containing a number of factors equivalent to the dimensions of the intermediate data set;
- computer program code for selecting from the factor sets a selected factor set in which a distance between the factors of the selected factor set is the least among the factor sets; and
- computer program code for assigning the processing elements such that for each dimension of the intermediate data set each processing element calculates grid points at intervals equal to the factors of the selected factor set in each respective dimension.

* * * * *

UNITED STATES PATENT AND TRADEMARK OFFICE
CERTIFICATE OF CORRECTION

| | | |
|---|---|---|
| PATENT NO. | : 7,174,052 B2 | Page 1 of 1 |
| APPLICATION NO. | : 10/342829 | |
| DATED | : February 6, 2007 | |
| INVENTOR(S) | : William Meredith Menger | |

It is certified that error appears in the above-identified patent and that said Letters Patent is hereby corrected as shown below:

Column 6, line 67 - please delete "recessing" and insert --processing--

Signed and Sealed this

Seventeenth Day of April, 2007

JON W. DUDAS
*Director of the United States Patent and Trademark Office*